United States Patent [19]

Dannar

[11] Patent Number: 5,309,617
[45] Date of Patent: May 10, 1994

[54] THREADED INSERT REMOVAL TOOL
[75] Inventor: Bruce L. R. Dannar, Chadron, Nebr.
[73] Assignee: Thiokol Corporation, Ogden, Utah
[21] Appl. No.: 73,348
[22] Filed: Jun. 7, 1993
[51] Int. Cl.⁵ .............................................. B23P 19/04
[52] U.S. Cl. ................................................... 29/240.5
[58] Field of Search ....................... 29/240.5, 275, 240;
72/325, 479; 409/307, 259

[56] References Cited

U.S. PATENT DOCUMENTS

| | | | |
|---|---|---|---|
| 2,027,922 | 1/1936 | McNaught | 72/325 |
| 2,547,509 | 4/1951 | Tozer | 409/259 |
| 2,825,750 | 3/1958 | Stockwell | 29/240.5 |
| 3,020,636 | 2/1962 | Ayton et al. | 72/325 |
| 3,685,336 | 8/1972 | Black | 72/325 |
| 4,177,659 | 12/1979 | Van Geffen | 72/325 |

FOREIGN PATENT DOCUMENTS 149941  5/1955  Sweden ................. 72/479

Primary Examiner—Robert C. Watson
Attorney, Agent, or Firm—Madson & Metcalf

[57] ABSTRACT

A tool for extracting threaded inserts from threaded holes. The tool includes a drive shaft and one or more blades extending from the drive shaft at its insertion end. Upon insertion of the tool into a hole containing a threaded insert, the blades cut grooves into the top coil of the insert. The tool is configured such that the blades have an outer radius greater than the inner radius of the threaded insert but less than the inner radius of the parent threads. By rotating the tool, the user may then exert pressure against the sides of these grooves and rotate the insert out of the hole. In a preferred embodiment, the tool also includes a guide shaft at the insertion end of the tool, for aligning the tool in the hole and reducing the risk of contact between a blade and the parent threads. The engagement end of the drive shaft, located opposite the insertion end, may be configured to engage a drive mechanism.

18 Claims, 3 Drawing Sheets

THREADED INSERT REMOVAL TOOL

BACKGROUND

1. The Field of the Invention

The present invention is related to a tool for extracting threaded inserts from threaded holes. More particularly, the present invention is related to a tool which is capable of cutting at least one groove in the interior surface of a threaded insert and then applying torque to the edge of the groove to twist the insert out of a threaded hole without risk of damage to the parent threads.

2. Technical Background

Threaded inserts are commonly used in the repair and refurbishing of mechanical mechanisms. In many situations it is common for threaded holes to be damaged such that the threads are no longer in their original usable condition. For example, it is common for a bolt placed within a threaded hole to become lodged. Removal of the bolt may require the application of forces sufficient to damage the threads within the threaded hole. Alternatively, simple wear and tear may eventually result in such damage to the threads within a hole that they will no longer satisfactorily perform their intended functions.

Once a set of threads is damaged, however, there are a limited number of steps that can be taken in order to reuse or replace the mechanical part which includes a threaded hole. One alternative is to discard the part. This alternative is only practical, however, when the part is relatively inexpensive and replacement parts are readily available. In the case of damaged threads included on large, complex, or expensive pieces of machinery, it may not be practical to simply replace the part. Rather, refurbishment of the part may be required.

One method of partially repairing damaged threads involves drilling out the damaged threads and then re-threading the new larger hole. It is obvious, however, that the new hole will no longer be capable of holding a bolt of the same size as the original hole. In order to solve this problem, it is conventional to insert a threaded insert, such as those sold under the Helicoil ® tradename, into the newly threaded hole.

A threaded insert is essentially a coiled helix. Such a device is a coiled strand, shaped in the same general manner as a coiled spring. The strand may be a rhombus or some other shape in cross-section. The insert is inserted into the newly threaded hole by first winding or compressing the coil in the same manner that a coil spring would be wound. Specialized tools are commercially available for winding a threaded insert for insertion. The diameter of the coil is reduced during the winding step, providing for easy insertion of the coil into the threaded hole. When the insertion tool is removed, the coil unwinds and expands, seating the coil into the parent threads. Thus, the coil engages the parent threads through friction.

Once the threaded insert is secured in place, it is possible to insert a bolt of the same size previously used in the device because the gap between the bolt and the parent threads is filled by the threaded insert. Thus, it is not necessary to replace the device having the damaged threads, or to resort to a larger sized bolt. As mentioned above, this mechanism is used in many different contexts, from small engines to very large and complex machinery.

Threaded inserts are commonly used in connection with aluminum. Because of its light weight compared to steel and many other metals, aluminum is a favored material for the construction of aircraft components and other parts employed in weight-sensitive contexts. However, aluminum is not as strong as heavier metals. Consequently, torque values which may be maintained in aluminum threads are necessarily limited. By utilizing a threaded insert, the parent threads may be bigger, thereby enhancing the torque per surface area ratio and resulting in stronger attachment of the bolt to the threads.

One problem that has been frequently encountered in the use of threaded inserts is the difficulty in removal of the inserts from the threaded holes after insertion. It is often necessary, over the life of a piece of machinery, to remove and replace the threaded inserts. Refurbishment of space shuttle booster motors, for instance, requires the removal of hundreds of threaded inserts; the nozzle assembly alone includes over 1500 holes in which threaded inserts are utilized. Reasons for removal may include corrosion between the insert and the parent threads, damage to the threaded insert during use, or a need to fully refurbish the mechanical part in which the insert is seated.

It is conventional in the art to remove threaded inserts by using a standard wedge-shaped extraction tool, such as that disclosed in U.S. Pat. No. 2,244,824 to H. Caminez. Such an extraction tool is wedged down into the interior of the threaded hole until it engages the threaded insert. The wedge is generally provided with sharpened edges which are driven into the inside diameter of the first coil of the threaded insert. Once the tool has engaged the coil, the tool is twisted in the appropriate direction to back the insert out of the parent threads.

It will be appreciated that this type of tool has serious drawbacks in extracting threaded inserts. One drawback relates to the forces which are exerted on the insert. In order for the wedge to securely maintain engagement with the insert during extraction, the wedge must continuously be forced toward the bottom of the hole. Because the wedge is triangular, forcing the wedge toward the bottom of the hole also forces the threaded insert outward against the parent threads. This outward force in turn increases the friction between the insert and the parent threads, making it harder to remove the insert. The outward force may also damage the parent threads.

Another disadvantage of the prior art wedge-shaped tool is apparent when the first thread of the insert lies appreciably below the top of the hole. In this situation, the wedge may directly engage and damage the parent threads. The hole must then be drilled out, rethreaded, and fitted with two threaded inserts instead of one to permit continued use of bolts of a given diameter. Use of a second insert in this manner may be unacceptable due to the time required, the proximity of other holes to the damaged hole, or other engineering constraints.

Yet another drawback of the wedge tool is the lack of any structure to align the tool with respect to the hole. Misalignment may permit one blade of the wedge to cut completely through the threaded insert and damage the parent threads when pressure is applied to the tool to secure it in engagement with the threaded insert.

A further drawback of the wedge tool is the tendency of the tool to induce carpal tunnel syndrome or similar ailments in workers who repeatedly employ the tool to remove threaded inserts. The top of the tool is fitted with a T-shaped handle, rather than a hex-shaped head or other configuration suitable for engaging the tool to a drive mechanism such as a ratchet or a motor. Moreover, even if a drive mechanism were attached, workers would still be required to manually maintain alignment, since the wedge tool lacks any structure to align the tool to protect the parent threads.

An additional drawback of prior art devices arises from the fact that many applications employ a flange above the hole. The flange prevents the user from visually determining whether there is a threaded insert in the hole. If the wedge tool is inserted in a hole that contains no insert, the wedge blades may engage and damage the parent threads before the leading tip of the wedge reaches the bottom of the hole. The tool of this invention, by contrast, permits a tactile determination of whether an insert is present without engaging the grooving edge of the blades against the parent threads.

Thus, it would be an advancement in the art to provide a tool for extraction of threaded inserts which overcomes the drawbacks of existing extraction tools. More particularly, it would be an advancement in the art to provide a threaded insert extraction tool which is capable of extracting inserts without the necessity of wedging the tool into the interior of the insert. Such an advancement would reduce both the risk of damage to the parent threads and the friction between the insert and the parent threads that opposes extraction.

It would also be an advancement in the art to provide such a removal tool which is capable of extracting threaded inserts positioned at various distances below the top of the hole without risking damage to the parent threads.

It would be an additional advancement to provide a tool whose blades are maintained in alignment with the hole, thereby reducing the danger of destroying the parent threads.

It would be a further advancement in the art to reduce the risk of carpal tunnel syndrome and similar ailments in workers by providing a threaded insert removal tool suitable for use with a drive mechanism.

It would also be an advancement to provide a threaded insert tool configured to permit a tactile determination of the presence or absence of an insert without significant risk to the parent threads of empty holes.

Such an apparatus is disclosed and claimed herein.

BRIEF SUMMARY AND OBJECTS OF THE INVENTION

The present invention is related to a tool for extracting threaded inserts from holes. The present invention provides a durable and efficient tool which reduces the risk of damage to the parent threads of the hole while extracting a threaded insert from the hole.

The tool of the present invention includes a drive shaft which serves to transfer insertion pressure and torque to appropriate points on the tool. One or more blades extending from the drive shaft at its insertion end are configured such that upon insertion of the tool into a hole containing a threaded insert, the blades cut grooves into at least the top coil of the insert. By rotating the tool, the user may then exert pressure against the sides of these grooves and remove the insert from the hole. Importantly, the outer radius of the blades is less than the inner radius of the parent threads, thereby preventing the blades from damaging the parent threads no matter how far the tool is inserted into the hole.

In the presently preferred embodiment, the tool also includes a guide shaft at the insertion end of the tool. Portions of the guide shaft are substantially the same diameter as the interior of the insert, thereby aligning the tool in the hole and reducing the risk of contact between the blades and the parent threads.

The engagement end of the drive shaft, located opposite the insertion end, may be configured in a T-shape so that the tool can be easily rotated by hand. Alternatively, the engagement end may be configured to mate with a mechanical device for turning the tool.

In a typical utilization, a user first selects an embodiment of the tool having a guide shaft substantially equal in diameter to the inside diameter of the threaded insert that is being removed. The guide shaft of the tool is then inserted into the interior of the threaded insert, thereby properly aligning the tool with respect to the hole. Insertion proceeds under minimal force until the grooving edge of a blade contacts the top coil of the threaded insert. Additional insertion force is then applied, driving the blade into the threaded insert. Each blade has a grooving edge that cuts a groove in the inside face of the threaded insert. A second portion of each blade, the torque transmission surface, follows the grooving edge into the groove.

Cutting a groove into the threaded may produce insert fragments. If the fragments become pinned between the threaded insert and the parent threads, the friction between the insert and the parent threads may be increased, making extraction more difficult. Thus, the insert fragments are preferably directed by the blades into a recess or channel between the threaded insert and the tool. After grooves are cut into at least one coil of the threaded insert, the threaded insert may be rotated out of the hole.

The threaded insert is rotated out of the hole by user rotation of the tool's drive shaft in the appropriate direction. Torque from the drive shaft is transferred by the torque transmission surface to the side of the groove in the insert, thereby causing the insert to rotate. Advantageously, no outward force is necessary to maintain engagement between the tool and the insert. Thus, the risk of damage to the parent threads inherent in the prior art wedge tool, as well as the increased friction between the insert and the parent threads, is not imposed by the present invention. After the insert is backed completely out of the hole, the tool may be disengaged from the insert by applying a small force opposite in orientation to the original insertion force.

From the foregoing, it will be appreciated that it is a primary object of the present invention to provide a tool for extraction of threaded inserts which overcomes the drawbacks of existing extraction tools.

More particularly, it is an object of the present invention to reduce both damage to the parent threads and the additional forces opposing extraction by providing a threaded insert extraction tool which is capable of extracting an insert without being wedged into the interior of the insert.

It is a related object of the invention to provide a threaded insert removal tool whose blades are aligned upon the tool's insertion so as to prevent the blades from engaging the parent threads.

It is also an object of the present invention to provide a threaded insert removal tool which can engage threaded inserts whose first coil lies well below the top of the hole, without also engaging the parent threads of the hole.

It is a further object of the invention to provide a threaded insert removal tool that is mechanically durable and inexpensive to manufacture.

Other advantages and objects of the invention will become apparent upon reading the following detailed description and appended claims, and upon reference to the accompanying drawings.

DETAILED DESCRIPTION OF THE PREFERRED EMBODIMENTS

Figure 1:
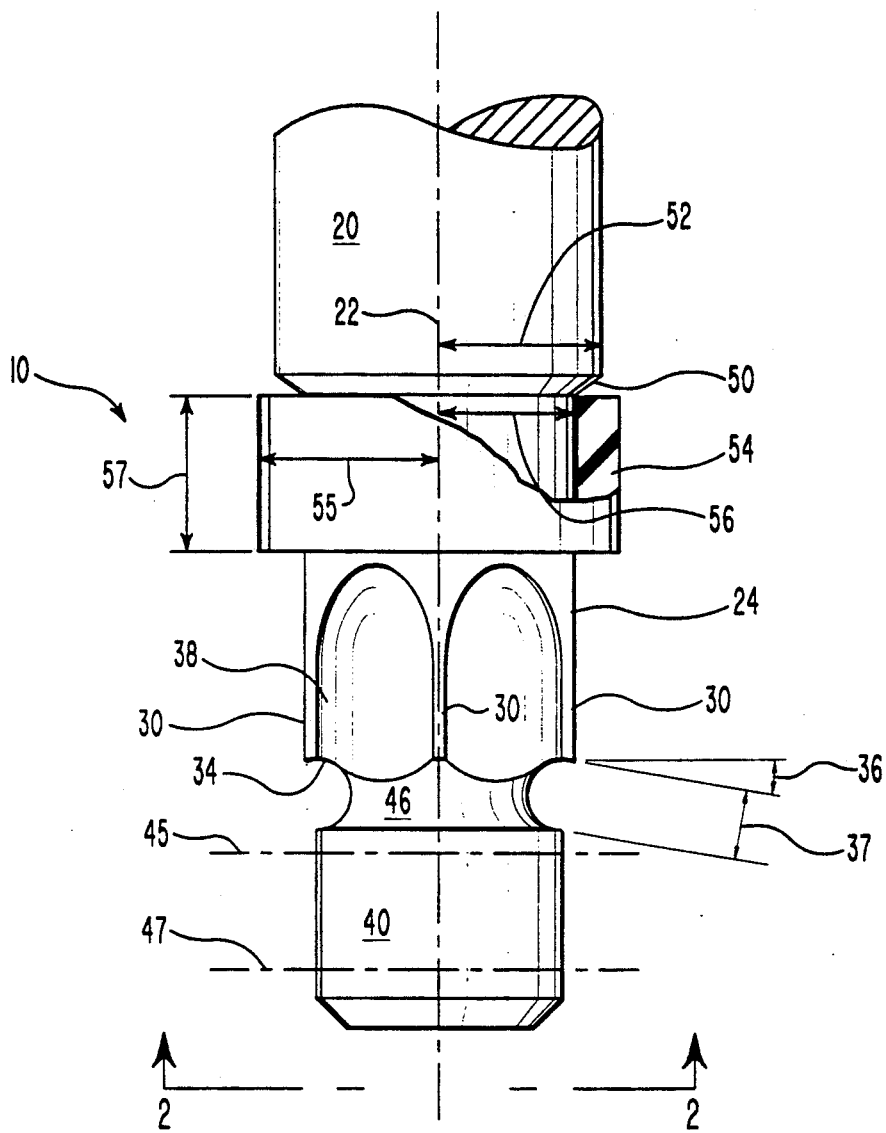
FIG. 1 is a side plan view of the presently preferred embodiment of the tool of the present invention, with a portion of the annular bushing cut away to more clearly illustrate the shoulder of the tool.

The present invention for removing threaded inserts is best understood by reference to the attached drawings where like parts are designated with like numerals throughout. As illustrated in FIG. 1, a presently preferred apparatus built in accordance with the teachings of the present invention is generally designated at 10.

The apparatus 10 comprises a drive shaft 20, a plurality of blades 30, a guide shaft 40, and a shoulder 50, which are disposed about a central axis 22. The drive shaft and other elements of the apparatus are preferably constructed of metal, such as M42, D2, or A6 tooth steel or other steel of acceptable grade. The presently preferred embodiment employs steel having a Rockwell hardness of approximately RC 55-62. However, one of skill in the art will appreciate that a variety of materials which are capable of withstanding the shear forces imposed may be used in constructing the tool of the present invention. The entire apparatus may be machined from a single piece of material, or separate pieces may be joined to form the apparatus. Separate attachments might be desirable, for instance, to permit use of the same drive shaft in conjunction with a variety of blades of different sizes. However, because of the ease with which various sizes of the tool may be produced, it is preferable that tools of various sizes be machined as separa'e, integral tools.

Figure 5:
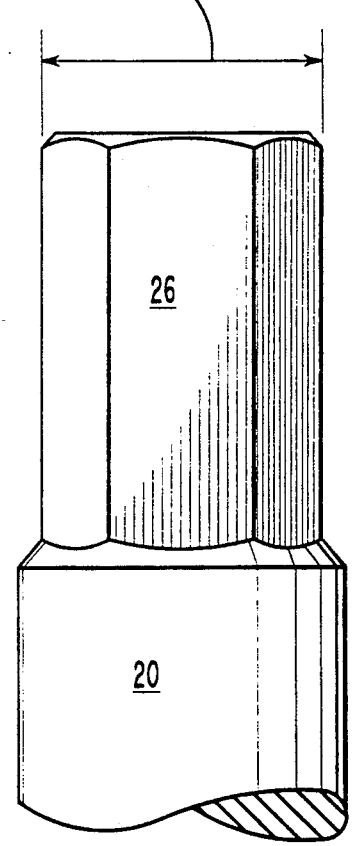
FIG. 5 is a side plan view of one embodiment of the engagement end of the tool.

The drive shaft 20 has two ends. As shown in FIG. 5, the engagement end 26 of the drive shaft 20 may be configured to engage a drive mechanism, such as a ratchet or an electric or pneumatic drill. It is presently preferred to utilize a low torque, low RPM air motor to drive the tool. Alternatively, the engagement end may be configured for manual use with a handle such as is conventionally used on screwdrivers, or with a T-handle. The drive shaft 20 also has an insertion end 24, shown in FIG. 1, for insertion into a threaded insert.

Figure 2:
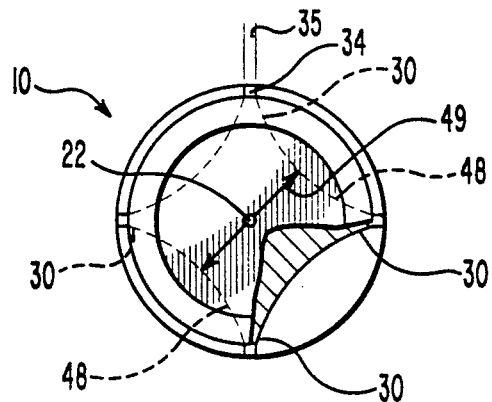
FIG. 2 is a cross-sectional view taken along line 2—2 of FIG. 1, with a portion cut away to more clearly illustrate the blades of the tool.

At least one blade 30 is located at the insertion end 24 of the drive shaft 20. The apparatus 10 preferably includes a plurality of blades 30 spaced equally about the perimeter of the tool, as shown in FIG. 1. The preferred spacing of the blades 30 is also illustrated in FIG. 2, which shows the apparatus 10 in cross section. The presently preferred embodiment illustrated in FIGS. 1 and 2 utilizes four blades. However, it will be appreciated by one of skill in the art that the appropriate number of blades depends on factors such as the material used to construct the tool, the depth of the grooves cut by the tool in the threaded insert, and the size of the threaded insert. Each additional blade beyond the first increases the insertion force required to cut grooves in the threaded insert, but additional blades also distribute more evenly the forces acting on the tool and on the insert as the insert is rotated out of the hole.

Figure 3:
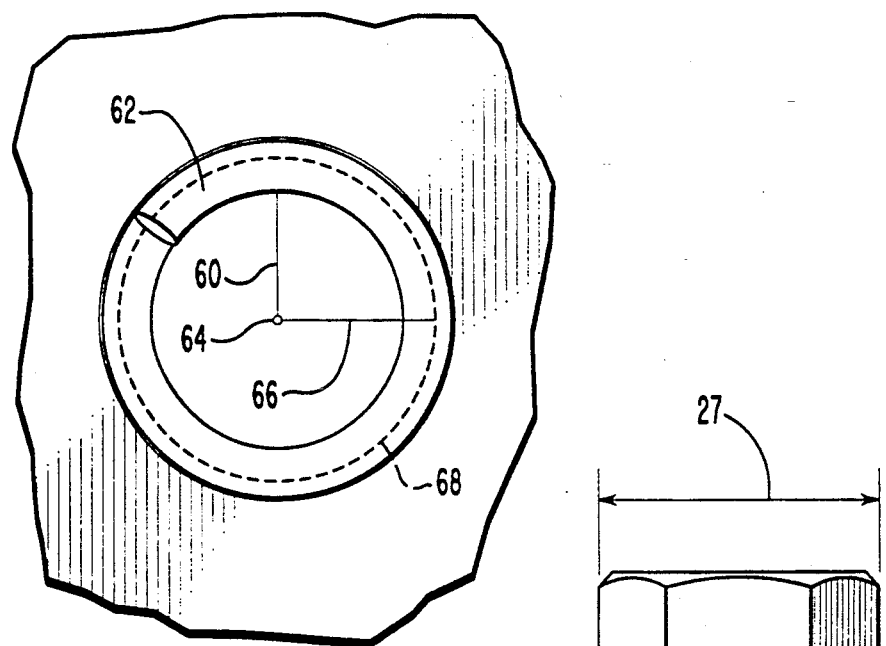
FIG. 3 is a top plan view of a threaded insert positioned in the parent threads of a hole.
Figure 4:
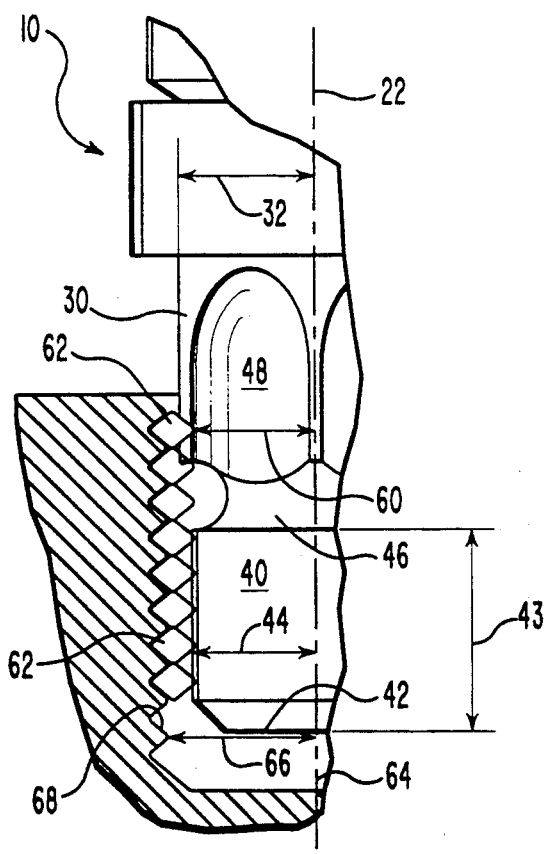
FIG. 4 is a side plan view of the embodiment of FIG. 1 as it is used to extract a threaded insert from the hole.

As illustrated in FIG. 4, the outer radius 32 of the blade 30 must be greater than the inner radius 60 of the threaded insert 62 for the blade 30 to cut a groove in the insert 62. The outer radius 32 of the blade 30 must also be less than the inner radius 66 of the parent threads 68 to prevent the blade 30 from damaging the parent thread 68. As used herein, the "outer radius" of a given element of the apparatus 10 is the maximum perpendicular distance between the central axis 22 and any point on the element in question. Thus, the outer radius 32 of the blade 30 is the largest distance, measured perpendicular to the central axis 22, from the central axis 22 to any point on the blade 30. As illustrated in FIG. 3, the inner radius 60 of the threaded insert 62 is the smallest distance between the threaded insert 62 and the central axis 64 of the hole.

Referring again to FIG. 1, the blade 30 preferably comprises both a grooving edge 34 for creating the groove in the threaded insert and a torque transmission surface 38 for transmitting torque from the drive shaft 20 to the threaded insert. As shown in FIG. 2, the grooving edge 34 is preferably substantially rectangular in cross section. The grooving edge 34 illustrated in FIG. 1 is configured as the upper portion of a semicircle adjacent the guide shaft 40. The semicircle is preferably tilted at a rake angle 36 of approximately fifteen degrees with respect to the central axis 22 of the apparatus 10. The rake angle of a semicircle relative to a line is the smallest angle between the line and the chord defined by the endpoints of the semicircle.

The embodiment shown in FIG. 1 also comprises a guide shaft 40 that serves to align the tool 10 as it is inserted in the hole. This guide shaft 40 preferably has a tapered end 42 to facilitate tool insertion. As shown in FIG. 4, the apparatus 10 is aligned when axis 22 of the apparatus and axis 64 of the hole are substantially collinear. The guide shaft 40 aligns the tool because the outer radius 44 of the guide shaft 40 is substantially equal to the inner radius 60 of the threaded insert 62.

Figure 6:
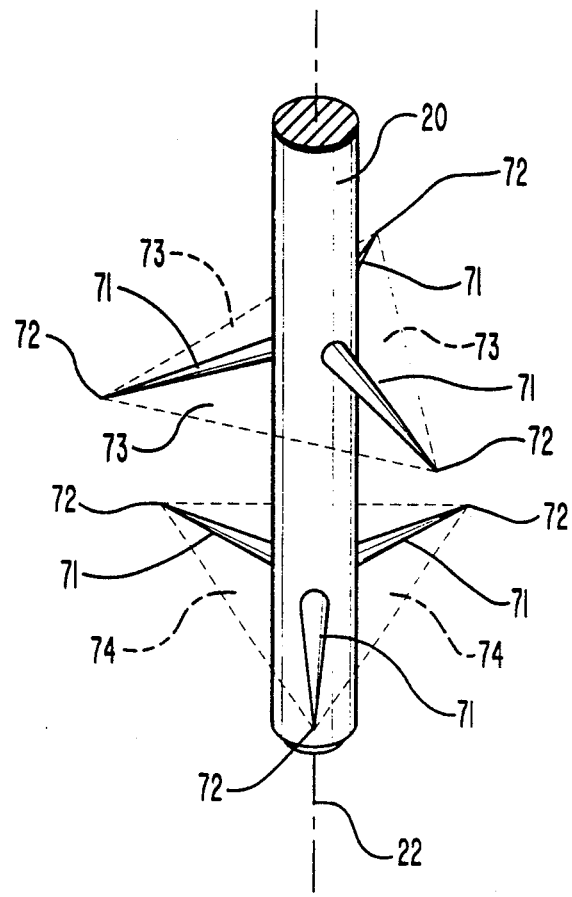
FIG. 6 is a perspective view of one alternative embodiment of the guide shaft of the present invention.
Figure 7:
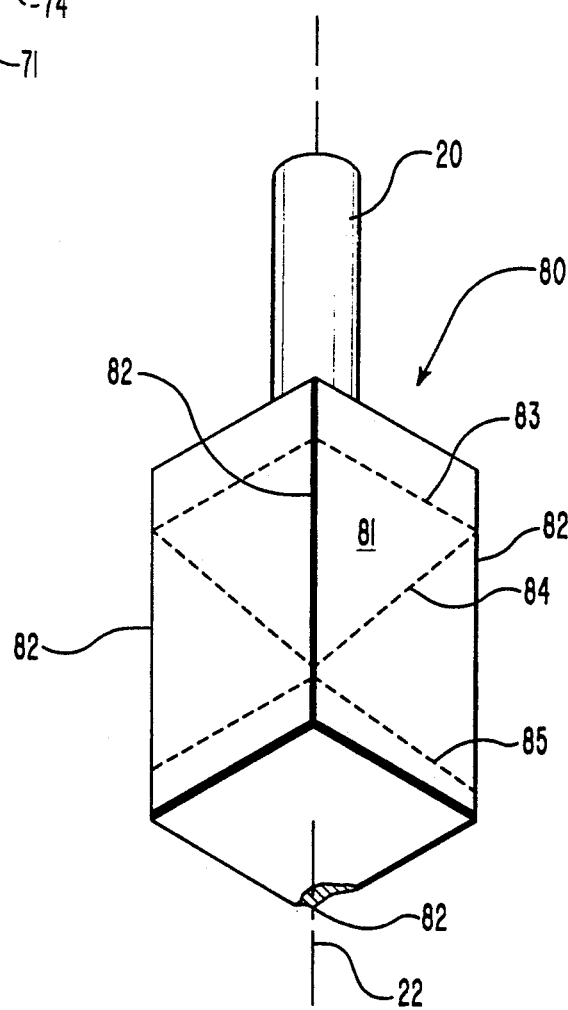
FIG. 7 is a perspective view of an additional alternative embodiment of the guide shaft.

Although the embodiment of the guide shaft 40 depicted in FIG. 1 is substantially cylindrical, it will be appreciated that a wide variety of shapes will serve equally well to align the apparatus within the threaded insert. FIGS. 6 and 7 illustrate two of the many possibilities.

To align the apparatus, an embodiment of the guide shaft must define at least two brace regions that intersect the central axis at different points. A brace region is the smallest convex region defined by the brace's contact points. A region is convex if the line segment lying between any two points of the region always lies within the region. Contact points are the points on the outer radius of the guide shaft, where the guide shaft may contact the threaded insert when the apparatus is inserted.

Thus, the contact points of the cylindrical guide shaft 40 in FIG. 1 form a cylinder. This cylinder defines a plurality of brace regions, including two brace regions which lie inside the two circles formed by the intersection of the cylinder and the two planes 45 and 47. Because these circular brace regions intersect the central axis 22 at different points, the embodiment of the guide shaft 40 shown in FIG. 1 will serve to align the apparatus.

However, embodiments other than the cylindrical guide shaft 40 of FIG. 1 may also serve to align the tool. The first alternative embodiment of the guide shaft 70 shown in FIG. 6 comprises two sets of arms 71 projecting outwardly from the drive shaft 20. These arms 71 may contact the threaded insert at six points 72, so the contact points 72 in this embodiment define two triangular brace regions 73 and 74. These two brace regions intersect the axis 22 at two different points, so the embodiment 70 of the guide shaft will serve to align the tool.

Of course, it will be appreciated by one of skill in the art that the guide shaft embodiment of FIG. 6 is presented here merely to elucidate the properties a guide shaft must have in order to align the tool properly with respect to the hole. In practice, the cylindrical guide shaft embodiment of FIG. 1 is preferable to the embodiment of FIG. 6, even though both will align the tool properly. The embodiment of FIG. 1 provides more contact points and therefore provides greater stability. Moreover, the cylindrical embodiment of FIG. 1 has greater structural strength and is easier to manufacture than the arms depicted in FIG. 6.

A second alternative embodiment 80, shown in FIG. 7, comprises a rectangular solid 81 that may contact the threaded insert at many points along the corner edges 82 of the solid 81. The four edges 82 thus define a plurality of square brace regions. Three of these regions are indicated at 83, 84, and 85. As illustrated, the brace regions need not be perpendicular to the central axis 22, but need merely intersect the axis 22 at two or more different points. As one of ordinary skill in the art will appreciate, other embodiments of the guide shaft may serve to align the apparatus by employing still other brace regions.

As shown in FIG. 1, the apparatus 10 is also preferably configured with a shoulder 50 to prevent the insertion end 42 of the guide shaft 40 from contacting the bottom of the hole. The outer radius 52 of the shoulder 50 preferably exceeds the outer radius of the hole. Thus, if the distance from the end 42 of the guide shaft 40 to the shoulder 50 is less than the depth of the hole, the shoulder will abut the outside edge of the hole and prevent further insertion before the end 42 of the guide shaft 4 reaches the bottom of the hole.

For some applications it may be desirable to modify the distance from the shoulder 50 to the end 42 of the tool. The effective length of the tool from the end 42 to the shoulder 50 may be easily altered by slipping an annular bushing 54 over the tool until the bushing 54 abuts the shoulder 50. Such a bushing 54 may be made of a variety of materials, including nylon, rubber, or steel.

In some applications, it is unknown which holes contain inserts and which are empty, and flanges above the holes make it difficult or impossible for the user to visually determine whether a hole is empty. In such circumstances, the tool 10 permits a tactile determination of the presence or absence of an insert without significant risk to the parent threads if the hole is empty. The tool provides certain tactile feedback to the user when the guide shaft 40 aligns the tool and when the grooving edges 34 of the blade 30 abut a threaded insert. In particular, proximity of the guide shaft 40 to a threaded insert prevents the tool from moving substantially out of alignment with the hole when gentle lateral pressure is applied. The tool 10 provides different tactile feedback when the guide shaft 40 is not constrained by a threaded insert, because lateral pressure easily moves the tool in and out of substantial alignment with the hole. Advantageously, the outer radius of the blades 30 is less than the inner radius of the parent threads, so the risk of damaging the parent threads of an empty hole is small.

The embodiment shown in FIG. 4 includes an annular recess 46 above the guide shaft and several channels 48 between the blades 30. These cavities serve as egress paths for fragments of the threaded insert when the tool 10 is utilized according to the teachings of the present invention. Additionally, these cavities facilitate access to the grooving edges of the blades so they may be sharpened.

Tables 1 and 2 set forth dimensions of presently preferred embodiments of the tool. All dimensions are in inches. In the Thread Size column, "LT" refers to "large twinsert" threaded inserts. Other column contents refer to the following dimensions: A is the guide shaft diameter, i.e., twice the guide shaft outer radius 44 of FIG. 4; B is the blade diameter, i.e., twice the outer radius 32 of FIG. 4; C is the drive shaft diameter, i.e., twice the outer radius 52 of FIG. 1; as shown in FIG. 4, D is the length 43 of the guide shaft 40 below the annular recess 46, including the tapered end 42; E is the diameter 37 of the annular recess 46 shown in FIG. 1; F is the outside diameter of the annular bushing 54, i.e., twice the outer radius 55 shown in FIG. 1; G is the height 57 of the annular bushing 54 shown in FIG. 1; H is the inside diameter of the annular bushing 54, i.e., twice the inner radius 56 shown in FIG. 1; I is the channel-to-channel distance 49 between channels 48 denoted in FIG. 2; J is the diameter 27 of the hex embodiment of the engagement end 26 of the tool shown in FIG. 5; and K is the width 35 of the grooving edge 34 illustrated in FIG. 2. These dimensions are only exemplary, and in no way limit the scope of the claims set forth below.

TABLE 1

| A | B | C | D | E | F | Thread Size |
|---|---|---|---|---|---|---|
| .190 | .240 | .375 | .380 | .100 | .500 | 1/4-28 |
| .250 | .290 | .375 | .380 | .100 | .500 | 1/4-28 LT |
| .190 | .250 | .375 | .380 | .100 | .500 | 1/4-20 |
| .250 | .310 | .375 | .380 | .100 | .500 | 1/4-20 LT |
| .250 | .310 | .375 | .380 | .100 | .500 | 5/16-24 |
| .315 | .360 | .375 | .380 | .150 | .500 | 5/16-24 LT |
| .320 | .370 | .500 | .380 | .150 | .700 | 3/8-24 |
| .380 | .420 | .500 | .380 | .150 | .700 | 3/8-24 LT |
| .430 | .500 | .625 | .380 | .200 | .800 | 1/2-20 |
| .500 | .560 | .625 | .380 | .200 | .800 | 1/2-20 LT |
| .500 | .620 | .750 | .380 | .200 | 1.000 | 5/8-11 |
| .640 | .740 | .750 | .380 | .200 | 1.000 | 5/8-11 LT |
| .550 | .620 | .750 | .380 | .200 | 1.000 | 5/8-18 |
| .620 | .680 | .750 | .380 | .200 | 1.000 | 5/8-18 LT |

TABLE 2

| G | H | I | J | K | Thread Size |
|---|---|---|---|---|---|
| .700 | .190 | .170 | 5/16 | .025 | 1/4-28 |
| .700 | .250 | .200 | 5/16 | .025 | 1/4-28 LT |

TABLE 2-continued

| G | H | I | J | K | Thread Size |
|---|---|---|---|---|---|
| .700 | .190 | .180 | 5/16 | .025 | 1/4-20 |
| .700 | .250 | .220 | 5/16 | .025 | 1/4-20 LT |
| .700 | .250 | .220 | 5/16 | .025 | 5/16-24 |
| .700 | .315 | .250 | 5/16 | .030 | 5/16-24 LT |
| .700 | .320 | .250 | 7/16 | .030 | 3/8-24 |
| .700 | .380 | .300 | 7/16 | .030 | 3/8-24 LT |
| .700 | .430 | .350 | 7/16 | .030 | 1/2-20 |
| .700 | .500 | .400 | 7/16 | .035 | 1/2-20 LT |
| .700 | .500 | .440 | 7/16 | .035 | 5/8-11 |
| .700 | .640 | .520 | 7/16 | .040 | 5/8-11 LT |
| .700 | .550 | .440 | 7/16 | .035 | 5/8-18 |
| .700 | .620 | .480 | 7/16 | .040 | 5/8-18 LT |

In utilizing the apparatus, a user first selects an embodiment of the tool having a guide shaft with an outer radius substantially equal to but slightly smaller than the inner radius of the threaded insert that is being removed. The tapered end of the guide shaft is inserted into the interior of the threaded insert. After at least two brace regions of the guide shaft lie inside the interior of the threaded insert, the axis of the tool and the axis of the hole will be substantially collinear, and the tool will therefore be aligned in a position that minimizes the risk of damage to the parent threads by the blades.

Insertion proceeds under minimal force until the grooving edge of a blade contacts the top coil of the threaded insert. Additional insertion force is then applied, for instance, by striking the engagement end of the tool with a hammer, to drive the blade into the threaded insert, until the tool reaches a position similar to that shown in FIG. 4. Under this additional insertion force, the grooving edge of each blade 30 will cut a groove in the inside face of the threaded insert 62, and the torque transmission surface will follow the grooving edge into the groove. Fragments produced during this process are directed into the annular recess 46 or the channels 48, thereby preventing the fragments from becoming lodged between the threaded insert 62 and the parent threads 68 or between the insert 62 and the guide shaft 40. After grooves are cut into at least one coil of the threaded insert 62, no further insertion pressure need be applied.

With the tool engaging the insert as described above, the user may rotate the drive shaft 20 in the appropriate direction to back the insert 62 out of the hole. Torque from the drive shaft 20 is transferred by the torque transmission surfaces to the sides of the grooves, thereby causing the insert 62 to rotate. Advantageously, no outward force is necessary to maintain engagement between the tool 10 and the insert 62, so the risk of damage to the parent threads 68 inherent in the prior art wedge tool, as well as increased friction between the insert 62 and the parent threads 68, is not imposed by the present invention. After the inser 62 is backed completely out of the hole, the tool 10 may be disengaged from the insert 62 by applying a small force opposite in orientation to the original insertion force. If the parent threads 68 are themselves formed by a second threaded insert disposed outside the first insert 62, this procedure may be repeated with another tool whose blades are of the proper size to engage the second insert, while avoiding the parent threads.

In summary, the present invention provides a tool for extraction of threaded inserts which overcomes the drawbacks of existing extraction tools. Both the risk of damage to the parent threads and the additional forces opposing extraction which exist under the prior art devices are reduced, because the threaded insert extraction tool disclosed herein is capable of extracting an insert without being wedged into the interior of the insert. This permits use of the tool to provide a tactile determination that a hole contains no threaded insert without significant risk of damage to the parent threads of an empty hole. Furthermore, the guide shaft of the present tool aligns the tool's blades upon insertion so as to prevent the blades from engaging the parent threads. In addition, the present tool can also engage threaded inserts whose first coil lies well below the top of the hole without engaging and thereby damaging the parent threads of the hole. The tool herein disclosed is also mechanically durable and inexpensive to manufacture.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for removing threaded inserts from a hole, the hole having a radius and having parent threads with an inner radius and the threaded insert having an inner radius, the apparatus comprising:
   a drive shaft configured about a central axis and having an engagement end and an insertion end;
   a blade positioned at the insertion end of the drive shaft, the blade extending outwardly from the central axis and having an outer radius greater than the inner radius of the threaded insert and less than the inner radius of the parent threads, such that upon forceful insertion of the apparatus into the hole, the blade may engage the threaded insert without damaging the parent threads; and
   a channel adjacent the blade for receiving fragments of the threaded insert produced by cutting action of the blade.

2. The apparatus of claim 1, wherein the blade is one of a plurality of blades that are spaced equidistantly about the central axis.

3. The apparatus of claim 1, further comprising a shoulder having an outer radius greater than the radius of the hole, the shoulder extending outwardly from the central axis between the blade and the engagement end of the drive shaft.

4. The apparatus of claim 1, wherein a portion of the blade furthest from the central axis is substantially parallel to the central axis.

5. An apparatus for removing threaded inserts from a hole, the hole having a radius, the threaded insert having an inner radius, the apparatus comprising:
   a drive shaft configured about a central axis and having an insertion end and an engagement end;
   a blade positioned at the insertion end of the drive shaft, the blade extending outwardly from the central axis and configured to engage the threaded insert;
   a channel adjacent the blade for receiving fragments of the threaded insert produced by cutting action of the blade; and
   a guide shaft positioned at the insertion end of the drive shaft, the guide shaft having an outer radius substantially the same as the inner radius of the threaded insert, the guide shaft configured with a plurality of braces, with each brace including a plurality of contact points positioned at the outer radius of the guide shaft, the contact points of each brace defining a brace region which intersects the central axis, the contact points positioned such that at least two brace regions intersect the central axis at different points, such that upon insertion of the apparatus into the hole, the guide shaft aligns the apparatus with respect to the threaded insert.

6. The apparatus of claim 5, wherein the blade is one of a plurality of blades that are spaced equidistantly about the central axis.

7. The apparatus of claim 5, further comprising an annular recess positioned between the blade and the guide shaft for receiving fragments of the threaded insert produced by cutting action of the blade.

8. The apparatus of claim 5, further comprising a shoulder having an outer radius greater than the radius of the hole, the shoulder extending outwardly from the central axis between the blade and the engagement end of the drive shaft.

9. The apparatus of claim 5, wherein the guide shaft has a tapered insertion end.

10. The apparatus of claim 5, wherein a portion of the blade furthest from the central axis is substantially parallel to the central axis.

11. An apparatus for removing threaded inserts from a hole, the hole having parent threads and a radius, the threaded insert having an inner radius, the apparatus comprising:

a drive shaft configured about a central axis and having an insertion end and an engagement end;

a substantially cylindrical guide shaft positioned at the insertion end of the drive shaft, the guide shaft having an outer radius substantially the same as the inner radius of the threaded insert; and a plurality of blades positioned at the insertion end of the drive shaft, the blades extending outwardly from and spaced equidistantly about the central axis, the blades having an outer radius greater than the inner radius of the threaded insert and less than the inner radius of the parent threads; and a channel adjacent each blade for receiving fragments of the threaded insert produced by cutting action of the blades.

12. The apparatus of claim 11, further comprising an annular recess positioned between the blades and the guide shaft for receiving fragments of the threaded insert produced by cutting action of the blades.

13. The apparatus of claim 11, further comprising a shoulder having an outer radius greater than the radius of the hole, the shoulder extending outwardly from the central axis between the blade and the engagement end of the drive shaft.

14. The apparatus of claim 11, wherein the guide shaft has a tapered insertion end.

15. The apparatus of claim 11, wherein at least one blade consists of a parallel outer portion and a remainder portion, the parallel outer portion of the blade being further from the central axis than the remainder portion, and the parallel outer portion being substantially parallel to the central axis.

16. The apparatus of claim 11, wherein each of the blades further comprises:

a curvilinear grooving edge configured near the outer radius of the blade, for cutting a groove into the threaded insert; and a torque transmission surface attached to the grooving edge, the torque transmission surface configured to engage the groove and transmit torque from the apparatus to the threaded insert when the drive shaft is rotated.

17. The apparatus of claim 16, wherein a cross section of the torque transmission surface taken perpendicular to the central axis comprises three sides of a substantially rectangular shape.

18. The apparatus of claim 11, wherein the engagement end of the drive shaft is configured to mate with a mechanical driving means.

* * * * *